Figure 1:
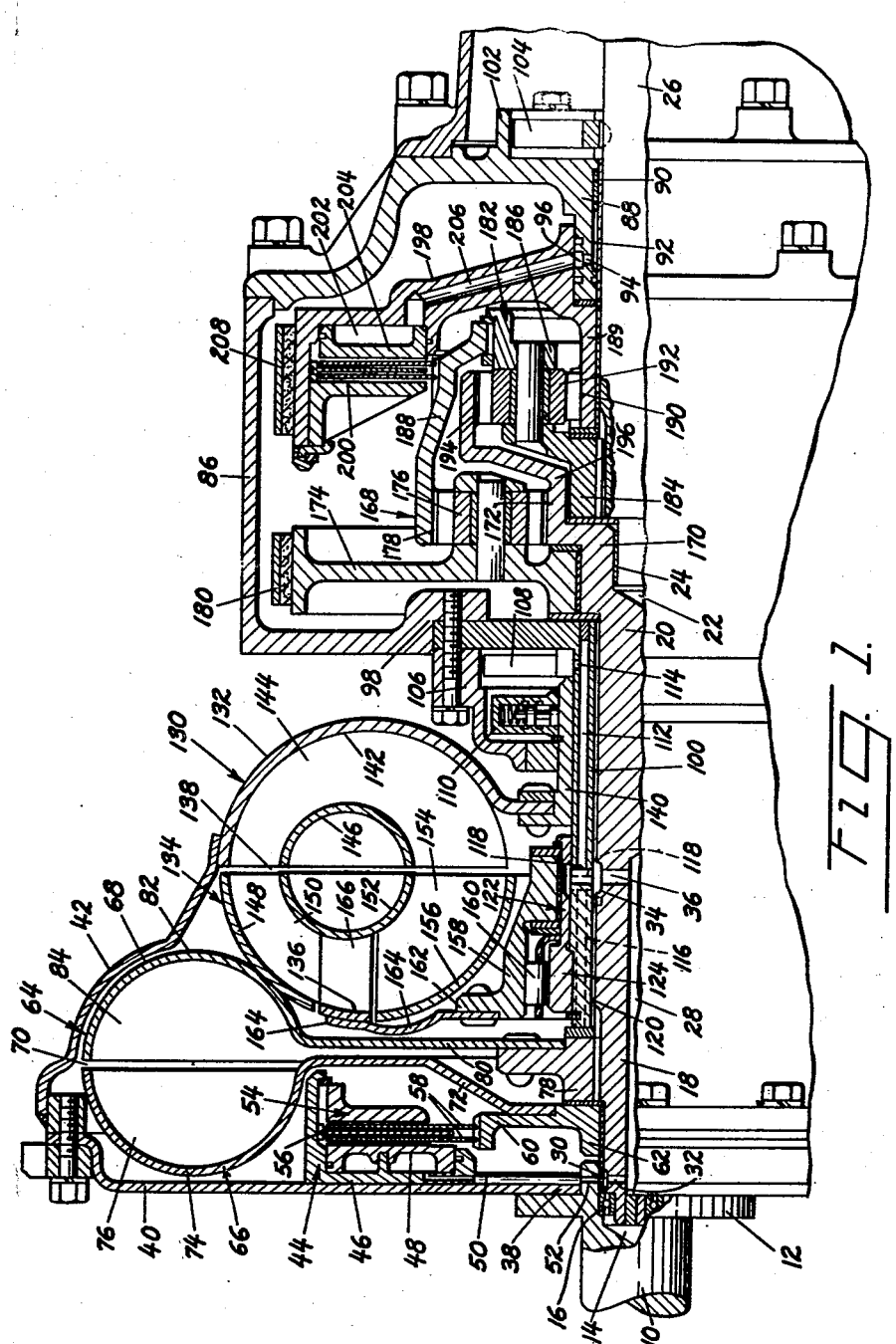

INVENTOR.
VLADIMIR J. JANDASEK
BY
O. H. Fowler
ATTORNEY.

Patented July 31, 1951

2,562,464

UNITED STATES PATENT OFFICE 2,562,464

TRANSMISSION

Vladimir J. Jandasek, Detroit, Mich., assignor to Bendix Aviation Corporation, Detroit, Mich., a corporation of Delaware Application October 29, 1945, Serial No. 625,308

8 Claims. (Cl. 74—732)

This invention relates to transmissions, and more particularly to combined fluid and mechanical transmissions.

Broadly the invention comprehends a transmission including a duplex fluid transmission coupled with a compound planetary gear system.

An object of the invention is to provide a transmission having the equivalent of four speeds forward.

Another object of the invention is to provide a transmission having a duplex fluid transmission, one operative to deliver power with torque multiplication.

Another object of the invention is to provide a transmission including a fluid coupling and a fluid torque converter adapted to operate in sequence and concomitantly.

Another object of the invention is to provide a transmission including a fluid coupling, a fluid torque converter and a compound planetary gear system.

Another object of the invention is to provide a transmission including a fluid coupling and a fluid torque converter, operative in sequence and concomitantly, coupled with a compound planetary gearing system operative to transmit power with torque multiplication, also as a coupling to effect one-to-one ratio drive, and to reverse the direction of power flow.

A further object of the invention is to provide a transmission including a fluid coupling and a fluid torque converter having a reaction member free to rotate in one direction and held against rotation in the reverse direction, and means under control of the reaction member operative to lock the impeller of the coupling to the impeller of the converter.

A further object of the invention is to provide a transmission including a duplex fluid transmission and a compound planetary gearing system both operative to transmit power with torque multiplication.

Yet a further object of the invention is to provide a transmission including a fluid coupling and a fluid torque converter having their driven elements fixedly secured to one another and their driving elements adapted to be connected to one another as a result of reaction on the fluid in the circuit of the converter.

A still further object of the invention is to provide a transmission including a fluid coupling, a fluid torque converter and a compound planetary gear system automatically operative to transmit power with duplex torque multiplication, to transmit power with torque multiplication, to transmit power through a unitary fluid drive, and to transmit power through a duplex fluid drive.

Yet a further object of the invention is to provide a transmission including a fluid coupling, a fluid torque converter, a compound planetary gearing system, and a fluid pressure system for control of these instrumentalities.

Still a further object of the invention is to provide a transmission including a fluid coupling, a fluid torque converter, a compound planetary gear system, and a fluid pressure system for automatic control of these instrumentalities, governed by the speed of a prime mover.

Figure 2:
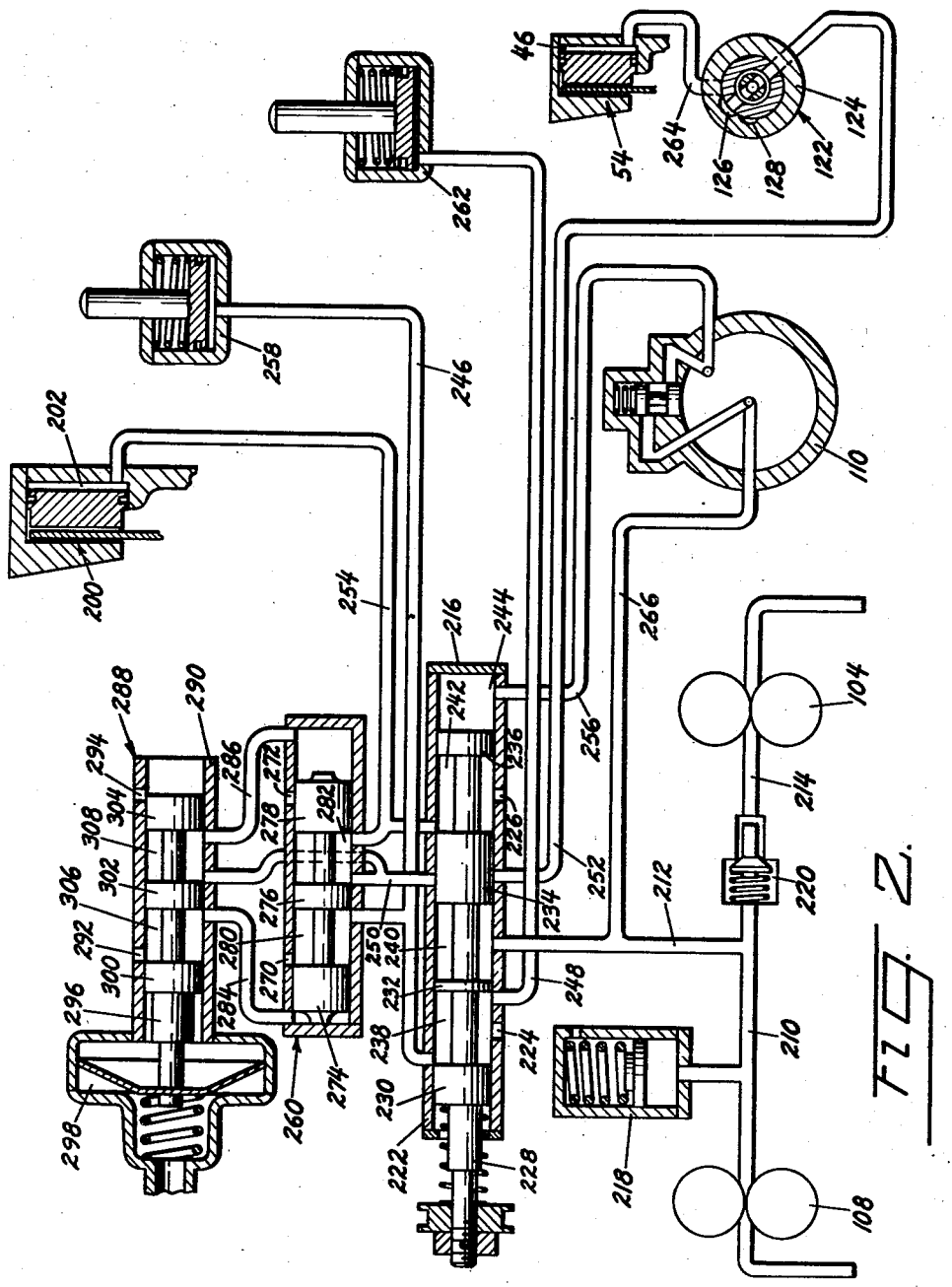

Other objects and advantages of the invention will appear from the following description taken in connection with the drawings forming a part of this specification, and in which:

Fig. 1 is a longitudinal sectional view of a transmission embodying the invention; and Fig. 2 is a diagrammatical illustration of a fluid pressure system for control of the transmission.

Referring to the drawings for more specific details of the invention, 10 represents the crankshaft of an internal combustion engine having a flange 12 and an axial recess 14. A bearing 16 fitted in the recess receives a center shaft 18 having a hub 20. The hub has an axial recess 22, and a bearing 24 fitted in the recess 22 receives a driven shaft 26.

The center shaft 18 has an axial passage 28, a circumferential groove 30 and a radial passage 32 providing a communication between the axial passage and a groove. The shaft also has a circumferential groove 34, and a radial passage 36 provides a communication between the axial passage 28 and the groove 34.

A hub 38 bolted or otherwise secured to the flange 12 of the crankshaft supports a web 40 having secured thereto a housing 42, and a fluid pressure actuated means indicated generally at 44 is fixedly secured to the web 40. The fluid pressure actuated means includes a cylinder 46 and a piston 48 reciprocable in the chamber of the cylinder and the chamber is connected as by a tube 50 to a passage 52 radially disposed in the hub 38 and in communication with the groove 30 in the center shaft 18.

A disc clutch indicated generally at 54 includes clutch plates 56 supported on the cylinder 46 in overhanging relation to the chamber of the cylinder 46 and interleafed with relatively movable clutch plates 58 carried by a web 60 supported on a hub 62 mounted for free rotation on the center shaft 18.

A fluid coupling indicated generally at 64 includes an impeller 66 and a runner 68 cooperating with one another to provide a fluid circuit 70. The impeller 66 includes a web 72 fixedly secured to the web 60 on the hub 62 of the clutch and a shroud 74 supported by the web 72 having arranged thereon spaced blades 76. The runner 68 includes a hub 78 splined to the center shaft 18, and a web 80 on the hub supporting a shroud 82 having arranged thereon spaced vanes 84.

A stationary housing 86 has a concentrically disposed hub 88 fitted with a bearing 90 for the reception of the driven shaft 26, and the hub has an internal annular groove providing a fluid passage 92 communicating as by a port 94 with a circumferential groove 96 in the hub. The housing 86 also has a hub 98 arranged in oppositely disposed relation to the hub 88, and the hub 98 rigidly supports a sleeve 100 fitted on the center shaft 18. The hub 88 has a concentrically disposed flange 102 providing a suitable housing for a pump 104 adapted to be driven by the driven shaft 26, and the hub 98 supports an auxiliary housing 106 for a pump 108 and a governor 110.

The sleeve 100 has in its wall a fluid passage 112 parallel to the axis of the sleeve, a radial port 114 providing a communication between the passage 112 and the pump 108, a passage 116 opening at the perimeter of the sleeve and a radial passage 118 extended through the wall of the sleeve and communicating with the groove 34 in the center shaft. The sleeve also has a longitudinal slot providing a fluid passage 120 for return of fluid to the sump, not shown.

A valve indicated generally at 122 includes a sleeve 124 mounted for slight angular movement on the sleeve 100, and the sleeve 124 has internal slots 126 and 128, the former adapted to provide communication between the ports 116 and 118 and the latter adapted to provide communication between the port 116 and the passage 120.

A torque converter indicated generally at 130 includes an impeller 132, a two-stage turbine 134, and a reaction member 136 cooperating with one another to provide a fluid circuit 138.

The impeller 132 includes a hub 140 mounted for rotation on the sleeve 100 and extended into the auxiliary housing 106 for attachment of the driving element of the pump 108, and a fluid seal is interposed between the hub and the wall of the auxiliary housing. The hub 140 supports a web 142 having arranged thereon spaced blades 144 supporting an inner shroud 146.

The two-stage turbine 134 includes a shroud 148 having thereon spaced vanes 150 supporting an inner shroud 152 for cooperation with the inner shroud 146, and the inner shroud has thereon spaced vanes 154 supporting an outer shroud 156. The vanes 150 constitute the first stage of the turbine and the vanes 154 constitute the second stage of the turbine.

The reaction member 136 includes a hub 158 mounted for free rotation in one direction on the sleeve 124 and held against rotation in the reverse direction by means 160 interposed between the hub and the sleeve, and the hub supports a flange 162 having thereon a shroud 164 supporting spaced vanes 166 between the first and second stages of the turbine.

A planetary gearing system indicated generally at 168 is enclosed in the housing 86. As shown, a hub 170 on the center shaft 18 supports a sun gear 172, a drum 174 mounted for free rotation on the hub supports spaced planet pinions 176 in mesh with the sun gear 172, an orbit gear 178 meshes with the pinions, and a fluid pressure actuated brake 180 serves to hold the drum against movement.

Another planetary gearing system, also in the housing, indicated generally at 182 includes a hub 184 splined to the driven shaft. The hub supports a spider 186 and keyed or otherwise secured to the spider is a drum 188 which provides a carrier for the orbit gear 178 of the planetary gearing system 168. A sleeve 189 on the driven shaft 26 supports a sun gear 190. Planet pinions 192 mounted for rotation on the spider 186 mesh with the sun gear 190, and an orbit gear 194 supported on a flange 196 integral with the hub 170 meshes with the pinions 192.

The sleeve 189 on the center shaft supports a drum 198 and a disc clutch 200 connected between the drums 188 and 198 is effective to lock the drums together. The clutch is controlled by a fluid pressure actuated means including a cylinder 202 and a piston 204 reciprocable in the cylinder, and the chamber of the cylinder is connected as by a fluid passage 206 extended through the drum and in communication with the groove 96 in the hub 88 of the housing 86, and a brake 208 controlled by a fluid pressure actuated motor serves to hold the drum 198 against movement.

A fluid pressure system for control of the transmission includes the fluid delivery pumps 104 and 108 connected as by conduits 210, 212 and 214 to a valve indicated generally at 216. An accumulator 218 is connected between the pumps and the valve, and a check valve 220 connected in the conduit 214 forward of the pump 104 inhibits retrograde movement of fluid through the pump 104.

The valve 216 includes a cylinder 222 having spaced discharge ports 224 and 226 which may be connected to a sump not shown and a piston 228 reciprocable in the cylinder has spaced lands 230, 232, 234 and 236 providing therebetween separate chambers 238, 240, 242 and 244 adapted to be connected upon reciprocation of the piston within its limits, to conduits 246, 248, 250, 252, 254 and 256.

The conduit 246 is connected to a fluid actuated motor 258 for actuation of the brake 208 and to a shifter valve indicated generally at 260, the purpose of which will hereinafter appear. The conduit 248 is connected to a fluid actuated motor 262 for actuation of the brake 180. The conduit 250 is connected to the shifter valve 260. The conduit 252 is connected to the valve 122 which in turn is connected by a conduit 264 to the cylinder 46 of the fluid pressure motor for actuation of the clutch 54. The conduit 254 is connected to the shifter valve 260 and to the cylinder 202 of the fluid pressure means for actuation of the clutch 200 and the conduit 256 is connected to the governor 110 which in turn is connected by a conduit 266 to the conduit 212.

The shifter valve 260 includes a cylinder having discharge ports 270 and 272 adapted to be connected to the sump, and a piston reciprocable in the cylinder having spaced lands 274, 276 and 278 providing therebetween spaced chambers 280 and 282 adapted to be connected upon reciprocation of the piston within its limits, to the conduits 246, 250 and 254, and the respective ends of the cylinder 260 are connected by conduits 284 and 286 to a vacuum-controlled valve indicated generally at 288.

The vacuum control valve 288 includes a cylinder 290 having spaced exhaust ports 292 and 294 adapted to be connected to the sump, and a piston 296 reciprocable in the cylinder under the influence of a pulsator 298 adapted to be connected to the manifold of a prime mover, not shown. The piston has lands 300, 302 and 304 providing therebetween chambers 306 and 308 adapted to be connected upon reciprocation of the piston, within its limits, to the conduits 250, 284 and 286.

In a normal operation, assuming that the fluid pressure system is in neutral as illustrated in Fig. 2, power received from the prime mover flows through the web 40 and the housing 42 to the impeller 132 of the torque converter, resulting in energization of the fluid in the circuit 138. The energy of the fluid is received on the vanes 150 and 154 of the first and second stages of the turbine 134 and on the vanes 166 of the reaction member. This results in rotation of the turbine and movement of the reaction member to its stationary position.

Upon rotation of the turbine, force is transmitted with torque multiplication through the web 80 and hub 78 to the center shaft 18. During this stage of operation, the governor 110 serves to hold the valve 216 against movement; however, upon attaining sufficient speed the fluid in the chamber 244 of the valve is released and the valve is automatically shifted to establish communication between the chamber 240 and the conduit 250, whereupon the fluid under pressure enters the chamber 306 of the vacuum-controlled valve 288, which has been shifted inwardly by the pulsator 298 under the influence of the prime mover. This shift of valve 288 establishes communication between the chamber 306 and the conduit 284, whereupon fluid under pressure flows through the conduit into the cylinder of the valve 260 forward of the land 274, resulting in shifting the valve 260 to establish communication between the chamber 280 and the conduit 250, whereupon fluid delivered by the conduit 250 into the chamber 280 flows therefrom through the conduit 246 to the fluid pressure actuated motor 258, causing energization thereof with the resultant application of the brake 208. Upon application of the brake 208, the sun gear 190 is held against movement and under this condition the power with torque multiplication delivered by the center shaft 18 flows through the planetary gear system 182 which serves to enhance the torque and to transfer this increased torque to the driven shaft.

Upon attaining a predetermined speed wherein the increased torque delivered by the planetary gear system 182 is no longer required, the vacuum in the manifold of the prime mover decreases and the spring of the vacuum-controlled valve becomes effective to shift the valve so as to establish communication between the chamber 308 of the vacuum-controlled valve and the conduits 250 and 286, whereupon fluid flows through the conduit 250, the chamber 308, and the conduit 286 into the shifter valve 260 back of the land 278, resulting in shifting the valve 260 to interrupt communication between the conduit 250, the chamber 280 and the conduit 246 so as to relieve the pressure on the fluid in the motor 258 to release the brake 208, and simultaneously with this operation communication is established between the chamber 282 and the conduit 254 whereupon fluid is delivered into the cylinder 202 of the fluid actuated means for the clutch 200, resulting in applying the clutch and effectively locking the planetary gearing system 182 for rotation as a single unit serving to transmit force from the center shaft to the driven shaft at a one-to-one ratio.

Upon attaining a predetermined speed where torque conversion is no longer required, reaction occurs on the fluid in the circuit 138, and this results in movement of the reaction member 136 on the holding means 160, whereupon the reaction member is released for free rotation in the circuit. As the reaction member disengages, the sleeve 124 is moved due to friction through a slight angle, and this results in opening the valve 122, and concomitantly with this operation the valve 216 is shifted by increase of pressure on the fluid in the chamber 244 to establish communication between the conduits 212 and 252, whereupon fluid flows through the conduits 212 and 252 and the valve 122 into the chamber of the cylinder 46 and this results in applying the clutch 54.

Upon applying the clutch 54, and impeller 66 of the fluid coupling is locked to rotate with the impeller 132 of the converter, which at this stage of operation also functions as a fluid coupling. Upon locking the impeller 66 for rotation with the impeller 132, the fluid in the circuit 70 of the coupling 64 is energized and the energy of the fluid is received by the runner 68. Power is then transmitted from the runner through the web 80 and hub 78 to the center shaft 18, and this power is augmented by power delivered by the converter 130 operating at this stage as a fluid coupling.

The power delivered by the fluid coupling 64 and the converter 130, operating as a fluid coupling, to the center shaft flows through the center shaft and the planetary gearing system, locked to rotate as a single unit connecting the center shaft to the driven shaft.

Upon decrease in speed to a rate where torque multiplication is again required, reaction on the fluid in the circuit causes the reaction member to move through a slight angle in reverse direction to a position, where it is held by the holding means 160. This movement of the reaction member rotates the sleeve 124 through a slight angle, resulting in closing the valve 122, whereupon pressure on the fluid in the cylinder 46 is released and the fluid in the cylinder escapes through the relief port of the valve and is returned to the sump.

Under this condition, the impeller 66 of the fluid coupling is released for free rotation, and, accordingly, does not transmit power through the fluid medium to the runner 68. Accordingly power from the prime mover is received solely by the impeller 132 of the converter and is delivered through the fluid medium to the turbine 134 and reaction member 136, and these instrumentalities serve to transmit the power with torque multiplication to the center shaft 18, and, as hereinabove recited, the power is transmitted through the center shaft and the planetary gear system, locked to rotate as a single unit, to the driven shaft.

Under this condition, should it become desirable to reverse the direction of travel, the valve 216 may be manually shifted so that the chamber 240 thereof communicates with conduits 212 and 248, whereupon fluid flows through the conduit 212, the chamber 240 and the conduit 248 to the fluid actuated motor 262, resulting in applying the brake 180. This serves to hold the planet pinions 176 of the planetary gear system 168 so as to reverse the direction of power flow, and under this condition the driven shaft 26 rotates in the reverse direction. This completes the cycle.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A transmission comprising a fluid coupling including cooperative driving and driven elements, a torque converter cooperating therewith including a driving element, a driven element secured to the driven element of the coupling and a reaction element free to rotate in one direction and held against rotation in the reverse direction, a clutch for connecting the driving elements together, means for actuating the clutch under control of the reaction element, a planetary gear system including a sun gear, planet pinions and an orbit gear connecting the driven elements to a driven shaft, means for holding the sun gear of the gearing system and means for locking the gearing system.

2. A transmission comprising a fluid coupling including cooperative driving and driven elements, a torque converter cooperating therewith including a driving element, a driven element secured to the driven element of the coupling, and a reaction element free to rotate in one direction and held against rotation in the reverse direction, a clutch for connecting the driving elements together, means for actuating the clutch under control of the reaction member, a planetary gearing system including a sun gear, planet pinions and an orbit gear connecting the driven elements to a driven member, fluid pressure actuated means for holding the sun gear of the planetary gearing system for the transmission of power with torque multiplication, fluid pressure actuated means for locking the planetary gearing system for the transmission of power at one-to-one ratio drive, and a gearing system for reversing the direction of drive coupled through the planet pinions of the planetary gearing system to the driven member, and fluid pressure actuated means for holding one of the gears of the reversing gearing system.

3. A transmission comprising a fluid coupling including a cooperative driving element and a driven element, a torque converter including a driving element, a driven element fixedly secured to the driven element of the coupling, and a reaction element freely rotatable in one direction and held against rotation in the reverse direction, a clutch for connecting the driving elements together for rotation in unison, a planetary gearing system including a sun gear, planet pinions and an orbit gear connecting the driven elements to a driven member, control means for the gearing system effective to hold the sun gear to transmit force with torque multiplication, control means for the gearing system operative to lock the gear system to effect a one-to-one ratio drive and a reverse gear system coupled through the planetary gearing system effective to reverse the direction of drive of the driven member.

4. A transmission comprising a fluid coupling including cooperative driving and driven elements, a torque converter cooperating therewith including a driving element, a driven element fixedly secured to the driven element of the coupling, and a reaction element, means under control of the reaction element for coupling the driving elements together, and a gearing system including planet pinions connected to the driven elements and operative to transmit power with torque multiplication to a driven member, and to transmit power at one-to-one ratio drive, and a reverse gearing system coupled through the planet pinions of the gearing system and effective to reverse the direction of drive of the driven member.

5. A transmission comprising a fluid coupling including cooperative driving and driven elements, a torque converter cooperating therewith including a driving element, a driven element fixedly secured to the driven element of the coupling and a movable reaction element, means under control of the reaction element for coupling the driving elements of the coupling and the converter for rotation in unison, a planetary gear system connecting the driven elements of the coupling and converter to a driven member, control elements for the planetary gearing system effective to operate the planetary gear system for the transmission of power with torque multiplication during one phase of operation, to operate the planetary gearing system as a single unit for the transmission of power at a one-to-one ratio drive during another phase of operation, and a gearing system connected through the planetary gear system effective to reverse the direction of drive of the driven member.

6. A transmission comprising a fluid coupling including cooperative driving and driven elements, a torque converter cooperating therewith including a driving element, a driven element secured to the driven element of the coupling, and a movable reaction element, means under control of the reaction element for coupling the driving elements of the coupling and the converter, a planetary gear system connecting the driven elements of the coupling and the converter to a driven member, a reverse gear system connected through the planet pinions of the planetary gear system, control elements for the planetary gear system, a speed responsive means for governing at least one of the control elements so as to effect transmission of power with torque multiplication, means for governing another of the control elements so as to transmit power at one-to-one drive ratio, and manually actuated means for control of the reverse gear system.

7. A transmission for a motor vehicle comprising a fluid coupling including cooperative driving and driven elements, a fluid torque converter cooperating therewith including a driving element, a driven element connected to the driven element of the coupling, and a movable reaction member free to rotate in one direction and held against rotation in the reverse direction, a clutch under control of the reaction element for coupling the driving elements of the coupling and the converter for rotation in unison, a planetary gear system connecting the driven elements of the coupling and converter to a driven member, control elements for the planetary gear system, a fluid pressure system connected to the control elements, a speed responsive means connected in the fluid pressure system for control of at least one of the control elements and a vacuum controlled valve connected in and governing the fluid pressure system.

8. A transmission for a motor vehicle comprising a fluid coupling including cooperative driving and driven elements, a fluid torque converter associated therewith including a driving element, a driven element secured to the driven element of the coupling and a movable reaction member, said converter operative in one phase to transmit power with torque multiplication and in another phase as a fluid coupling, a fluid pressure actuated element operative to couple the driving elements of the coupling and the converter for rotation in unison, a planetary gear system connecting the driven elements of the coupling and converter to a driven member, a reverse drive gear system connected through the planet pinions of the planetary gear system, fluid pressure actuated elements for controlling the planetary gear system, a fluid pressure actuated element for control of the reverse drive gear system, a fluid pressure system connected to the fluid pressure actuated elements for coupling the driving elements of the coupling and the converter and to the fluid pressure actuated elements for control of the planetary gear system and the reverse drive system, said fluid pressure system including pumps for delivery of fluid under pressure, a slide valve connected to the output of the pumps, a speed responsive means connected between the output of the pumps and the slide valve, means connecting the slide valve to the fluid pressure actuated means to couple the driving elements of the coupling and converter when the converter operates as a fluid coupling, means connecting the slide valve to one of the fluid pressure actuated elements for holding the sun gear of the planetary gear system so as to transmit power with torque multiplication, means connecting the slide valve to another fluid pressure actuated element for locking the planetary gear system to effect one-to-one ratio drive, means connecting the slide valve to yet another fluid pressure actuated element for effectively reversing the direction of drive of the driven member, a shift valve connected to the slide valve and to at least one of the control elements and a vacuum actuated valve connected to the slide valve and governing the fluid pressure system.

VLADIMIR J. JANDASEK.

REFERENCES CITED

The following references are of record in the file of this patent:

UNITED STATES PATENTS

| Number | Name | Date |
| --- | --- | --- |
| 2,078,287 | Seibold | Apr. 27, 1937 |
| 2,093,498 | Walti | Sept. 21, 1937 |
| 2,142,199 | Lysholm | Jan. 3, 1939 |
| 2,194,949 | Lysholm | Mar. 26, 1940 |
| 2,322,251 | Pollard | June 22, 1943 |
| 2,368,873 | Pollard | Feb. 6, 1945 |
| 2,407,289 | LaBrie | Sept. 10, 1946 |

FOREIGN PATENTS

| Number | Country | Date |
| --- | --- | --- |
| 367,079 | Great Britain | Feb. 18, 1932 |